Patented July 3, 1951

2,559,481

UNITED STATES PATENT OFFICE 2,559,481

BAKER'S GREASE

Robert S. Truesdell, Los Angeles, Calif., assignor to Don Parsons and Wayne Hanson, both of Los Angeles, Calif.

No Drawing. Application January 18, 1949, Serial No. 71,545

2 Claims. (Cl. 99—118)

This invention relates to a grease composition and to a method of making same and has as its primary object the provision of a grease which is especially applicable for use by bakers in greasing baking pans employed in the baking of bread, cakes, cookies and similar bakery products.

A particular object of the invention is to provide a grease of the above character which is capable of withstanding ordinary baking temperatures, that is the heat of ovens employed in the baking of bread, cakes and the like, so as to obviate accumulations of carbon on the baking pans as is incident to the use of lard, fat or other greasing agents commonly employed in such baking operations and which are subject to char under baking temperatures, thus eliminating at least to a great extent the necessity of removing carbon incrustations from the baking pans thereby effecting considerable economy in the production of such baked products and increasing the usability and life of the baking pans which are frequently damaged and rendered unfit for use in the operations of removing incrustations burned thereon.

Another object is to provide a baker's grease which is highly and economically durable, that is, which will permit a comparatively large number of baking operations after once being applied to the baking utensil without necessitating regreasing thereof; it heretofore being common and necessary practice to usually regrease baking pans after each baking operation.

Another object is to provide a baker's grease which will render unnecessary the use of paper linings in baking pans as are commonly employed in the baking of cup cakes, sponge cakes and the like.

Another object is to provide a baker's grease which when applied to new pans eliminates customary burning in or curing of such new pans as heretofore generally practiced, thus effecting a saving in time, labor and materials when employing new pans.

A further object is to provide a method of producing a compounded baker's grease whereby the several ingredients thereof will be thoroughly blended and held in intermixture against separation.

With the foregoing objects in view together with such other objects and advantages as may subsequently appear the invention is carried into effect by the employment of certain substances and the treatment thereof hereinafter specified and defined in the claims.

The substances employed consist of a potable oil, lecithin and beeswax. The oil used may consist of either mineral oil, vegetable oil, or a mixture of both. The mineral oil preferably employed is a heavy quality refined mineral oil of commerce having a viscosity of 500 or thereabouts at 100° F. and characterized by a flash point of 495° F. and a fire point of 545° F., although such qualities are not critical. A mineral oil having a viscosity of 340, flash point of 420° F. and a fire point of 424° F. may be used in some instances and accordingly an oil having the recited properties between or approximating the points stated may be employed; the essential feature being that the oil be not subject to ignition at the temperatures developed in an oven during a particular baking operation. However, in order to produce a commercial product for all purpose bakery operations it is necessary to employ an oil having at least the higher viscosity, flash point and fire point above stated. It is highly desirable that where mineral oil is used that it be pure; colorless, odorless, and tasteless, contain no paraffin, inorganic matter, organic sulphur compounds, anthracene, or injurious hydrocarbons.

Various vegetable oils may be employed such as cotton seed oil, olive oil, soy bean oil and the like having properties of viscosity, flash point and fire point, comparable to those of mineral oil above recited; vegetable oils producing an excellent and highly desirable product, but at present market prices being of such high cost as to practically eliminate their use in favor of mineral oil because of the greatly lesser cost of the latter.

Manifestly a mixture of potable mineral and vegetable oils may be employed where desired.

The lecithin employed is one derived from soy bean oil having a flash point of 585° F. or thereabouts.

The beeswax preferably employed is pure yellow beeswax of commerce.

The proportions of the several materials employed is not critical and is subject to considerable variations.

A highly satisfactory product is obtained by a mixture of the several ingredients in the following proportions:

Five (5) gallons of either vegetable or mineral oil, two and one-half (2½) to six (6) lbs. of lecithin and one (1) to three (3) lbs. beeswax.

Lecithin as obtained on the market under various brands may vary as to density or thickness and accordingly the proportion of lecithin employed is varied according to its quality. Using the heavier grade, two and one-half (2½) lbs. of lecithin to five (5) gallons oil is sufficient, whereas if the lighter grade is used six (6) lbs. or thereabouts of lecithin to five (5) gallons of oil may be required.

In the production of the product in a batch for commercial purposes the proportions of the ingredients found highly desirable and preferably employed is as follows:

| | |
|---|---|
| Oil | gallons 216 |
| Lecithin | pounds 180 |
| Beeswax | do 125 |

It is to be understood however that the above stated proportions of ingredients are given only by way of example and not by way of limitation, since the proportions may be still further varied according to the quality or requirement of the product. For example, where it might be desired to apply the grease to pans after every baking operation then the proportions of lecithin and beeswax relative to the mineral oil may be reduced to lower than that above stated.

The several ingredients are compounded by first heating the oil in a suitable tank to a temperature of from 150° to 180° F. and then adding the lecithin to the heated oil.

The beeswax is separately heated and melted and while melted is stirred into the heated mixture of oil of lecithin. The mixture is then subjected to agitation such as to effect thorough intermixture of the ingredients. The mixture is then homogenized by running it through a suitable homogenizer to thoroughly blend the ingredients and insure against their subsequent separation.

The resultant mixture where the material of the higher named qualities are used constitutes an oleaginous product having a viscosity of 100° F. of 500 seconds or thereabouts, a flash point of 495° F. and a fire point of 545° F. and accordingly being quite fluid may be readily applied to the surfaces of baking pans, trays and similar utensils to produce a greasy coating thereon. It may be applied either cold or at room temperature or it may be heated and it may be applied as by swabbing, brushing or spraying.

The material has the property of clinging to a metallic surface and will serve, when applied as a greasing agent to baking utensils, to form an oleaginous film on the metallic surfaces of utensils while bodies of dough are imposed thereon, so that on subjecting the dough to a baking action, the dough will be maintained out of contact with the metallic surface of the utensils and will thus be prevented from adhering thereto. The high burning point of the product insures against its becoming charred under ordinary baking temperature which seldom exceeds 450° F.

The beeswax and the lecithin imparts such stability to the product that the film interposed between the utensil and dough will cling to upstanding walls without running and because of the water moist character of the dough of bakery products the compounded grease has little or no tendency to adhere thereto and accordingly on removing the baked articles from the baking utensil the baked dough readily separates from the film without leaving deposits or incrustations of dough on the utensil and without any detachable amount of the grease clinging to the baked article. By reason of this property or characteristic of the product it is possible to repeatedly utilize the baking utensils in baking operations without regreasing thereof after once being thoroughly coated with the product. As many as nineteen bakings of bread have been effected with conventional commercial baking pans with one application of the product. However, the number of baking operations that may be effected with one greasing operation is dependent largely upon the care exercised in effecting application of the product to the cooking utensil; the more uniform the application the better the results attained. The efficiency of the product is also dependent on the grade thereof that is according to the height of the flash and fire points thereof; the greater such flash and fire points the more effective the performance of the product.

I claim:

1. The method of producing a baker's grease consisting in heating a potable oil to a temperature of at least 150° F., adding lecithin to the heated oil, then adding melted beeswax to the heated oil and lecithin mixture under agitation and homogenizing the mixture.

2. The method of producing a baker's grease consisting in heating a potable oil to a temperature of at least 150° F., adding lecithin to the heated oil, then adding melted beeswax to the heated oil and lecithin mixture under agitation, and homogenizing the mixture; the ingredients beings used in the proportions of 216 gallons potable oil, 180 pounds lecithin, and 125 pounds beeswax.

ROBERT S. TRUESDELL.

REFERENCES CITED

The following references are of record in the file of this patent:

UNITED STATES PATENTS

| Number | Name | Date |
|---|---|---|
| 1,328,556 | Bloch | Jan. 20, 1920 |
| 1,483,704 | Wilcox | Feb. 12, 1924 |
| 2,144,371 | Griffith | Jan. 17, 1939 |